(12) United States Patent
Fernando et al.

(10) Patent No.: US 6,434,163 B1
(45) Date of Patent: Aug. 13, 2002

(54) TRANSVERSE CORRELATOR STRUCTURE FOR A RAKE RECEIVER

(75) Inventors: John Susantha Fernando, Coopersburg, PA (US); Mohit Kishore Prasad, San Diego, CA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/169,674

(22) Filed: Oct. 10, 1998

(51) Int. Cl.[7] ............................................. H04B 7/216
(52) U.S. Cl. ........................ 370/441; 370/203; 375/130
(58) Field of Search ................... 370/441, 320, 370/335, 342, 203, 204, 205, 208, 206, 479, 515, 537, 538, 539, 540; 375/130, 136, 142, 150, 152, 343, 367

(56) References Cited

U.S. PATENT DOCUMENTS

| | | | | |
|---|---|---|---|---|
| 5,533,047 A | * | 7/1996 | Mourot et al. | 375/149 |
| 5,559,829 A | * | 9/1996 | Le Strat et al. | 375/141 |
| 5,671,221 A | * | 9/1997 | Yang | 370/320 |
| 5,757,791 A | * | 5/1998 | Kanterakis et al. | 370/342 |
| 5,761,237 A | * | 6/1998 | Petersen et al. | 375/148 |
| 6,157,685 A | * | 12/2000 | Tanaka et al. | 375/346 |
| 6,163,563 A | * | 12/2000 | Baker et al. | 375/130 |
| 6,275,545 B1 | * | 8/2001 | Suzuki | 375/343 |

* cited by examiner

*Primary Examiner*—Dang Ton
*Assistant Examiner*—Brian Nguyen
(74) *Attorney, Agent, or Firm*—Wendy W. Koba

(57) ABSTRACT

A RAKE receiver for use in a CDMA system is implemented as a transverse correlator in the complex domain. The transverse topology results in the correlator comprising a plurality of serial stages, each stage formed as a canonical unit of a multiplier, adder and memory. When implemented in the complex domain, the multiplier is replaced by multiplexers and the hardware may be significantly reduced by multiplexing between the I and Q components.

21 Claims, 5 Drawing Sheets

TRANSVERSE CORRELATOR STRUCTURE FOR A RAKE RECEIVER

BACKGROUND OF THE INVENTION

The present invention relates to a RAKE receiver structure and, more particularly, to a RAKE receiver with minimal area, gate delay and power requirements accomplished by implementing the RAKE receiver as a transverse correlator in the complex domain.

In CDMA receivers, one of the most important units is the RAKE receiver. In particular, a RAKE receiver contains a matched filter which resolves the multi-path components of the incoming signal. Additionally, the RAKE receiver must match the incoming signal to a local user code to authenticate reception. The matched filter achieves this result by correlating the received signal x(n) with a buffered sequence s(n) defined as a pseudo-random noise (PN) sequence.

In most conventional implementations of the RAKE receiver, the correlation length is usually large, where the actual size depends on the particular function for the correlator output. In many circumstances, the length may be as large as 512 samples. The correlation operation is very similar to the Finite Impulse Response (FIR) filter operation. Consequently, the problems associated with implementing the correlator in silicon are similar to implementing FIR filters with a large number of coefficients. Implementation becomes more difficult since addition and subtraction operations for the correlator are defined in the complex domain. Moreover, the correlator is the most active component of the RAKE receiver and is a major drain on the battery power in a mobile terminal.

SUMMARY OF THE INVENTION

These and other RAKE receiver problems present in the prior art are addressed by the present invention, which relates to a RAKE receiver structure and, more particularly, to a RAKE receiver with minimal area, gate delay and power requirements accomplished by implementing the RAKE receiver as a transverse correlator in the complex domain.

In accordance with the present invention, the RAKE receiver correlator comprises a transverse correlator formed as a serial plurality of N functional units, each functional unit comprising a multiplier, an adder and a memory device (e.g., D flip-flops). The received signal is applied as an input to each multiplier, where the remaining input is a single bit of a local pseudo-random sequence s(n). The product is then added to all the products from each previous stage to form the "intermediate" correlation product $R_{xs}$ for that stage. Therefore, in accordance with the present invention, the required addition is spread out over each stage of multiplication.

In a preferred embodiment of the present invention, the received signal x(n) and sequence s(n) are parsed into a pair of complex I and Q components. Each functional unit is then configured to separately process the I and Q rail information. Since the same operations are performed on each component, the same functional unit may be used to form each component by incorporating a mulitplexer to control the inputs (i.e., either "I" or "Q") applied to each functional unit.

In association with another feature of the present invention, an m-bit carry-save adder may be used in place of a conventional carry-propagate adder. In this form, the switching activity, and therefore power, is minimized (since the carry bits do not need to propagate along the entire m-bit length of the addition at each stage). That is, the final "sum" is performed only at the last stage.

Other and further features of the present invention will become apparent during the course of the following discussion and by reference to the accompanying drawings.

BRIEF DESCRIPTION OF THE DRAWINGS

Referring now to the drawings, where like numerals represent like parts in several views:

FIG. 5 is a detailed view of the exemplary m-bit carry-save adder, with multiplexers used to reduce the necessary hardware;

DETAILED DESCRIPTION

In many communication systems, particularly in mobile radio systems, diversity is a technique used to combat signal fading. In general, diversity is based upon the premise that if several replicas of the same information-carrying signal are received over multiple channels that are subject to independent fading problems, the likelihood of the reception of one or more strong signals (at any given time) is significantly increased. Diversity may be accomplished explicitly by transmitting multiple copies of the same information on different channels. Alternatively, the signal may be launched only once, but the "decorrelating" properties of the transmission medium are exploited ("multipath") to receive multiple versions of the same information (often referred to as "implicit" diversity) The RAKE receiver of the present invention is implemented to receive a signal transmitted in such an implicitly diverse manner. In general, the incoming sampled signal x(n) is correlated with a pseudo-random noise (PN) sequence s(n), where in the ideal condition the correlation length is infinite. In implementation, a cyclic PN sequence s(n) is used and a relatively short correlation length (for example, 64, 128, 256 or 512 in IS-95 applications) is chosen. The correlation is then expressed as an estimate:

$$\tilde{R}_{xs}(n) = \sum_{k=0}^{63} x(k)s^*(n+k), \quad (1)$$

for a correlation length of 64, where * denotes the complex conjugate of PN sequence s(n). Expressed as a complex value, x(n)=xI(n)+jxQ(n) and, similarly, s*(n)=sI(n)−jsQ(n). Therefore, the above summation may be expressed as follows:

$$\tilde{R}_{xs}(n) = \sum_{n=0}^{63} \{(xI(n+k)sI(k) + xQ(n+k)sQ(k)) + \quad (2)$$
$$j(xQ(n+k)sI(k) - xI(n+k)sQ(k))\}$$

The following discussion and figures will presume a correlation length of 64. It is to be understood, however, that the various features of the present invention are equally applicable to any desired correlation length.

Figure 1:
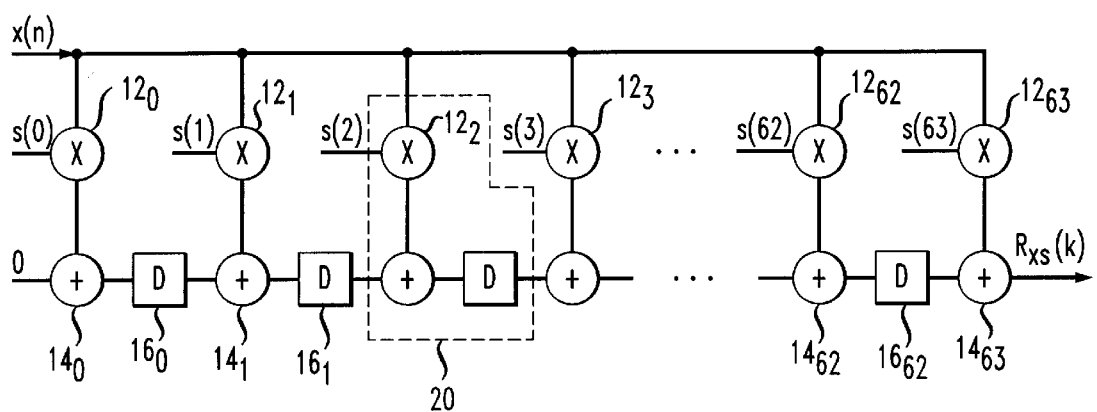
FIG. 1 illustrates an exemplary transpose form implementation of a RAKE correlator.

FIG. 1 illustrates the transpose form implementation of an exemplary RAKE correlator 10 capable of implementing the above function in the complex domain. As shown, the received signal x(n) is applied as a first input to correlator 10, where in particular x(n) is applied as a first input to a plurality of multipliers $12_0$–$12_{63}$. Each element of the 64-element PN sequence s(n) is applied as the remaining input to each separate multiplier $12_0$–$12_{63}$ (that is, element s(0) is applied as an input to multiplier $12_0$, element s(1) to multiplier $12_1$, and so on, with element s(63) applied as an input to multiplier $12_{63}$). Referring to the first stage of correlator 10, the product s(0)×(n) is then used as an input to an adder $14_0$, where the other input is "zero", since this is first stage of the correlator. The sum of 0+s(0)×(n) is then applied as an input to a first set of D flip-flops $16_0$, where sets of D flip-flops are used as an exemplary memory stage of the correlator (other types of memory structures may also be used). Referring to FIG. 1, the next stage of correlator 10 comprises a multiplier $12_1$, adder $14_1$, and D flip-flop set $16_1$. As shown, received signal x(n) is used as a first input to multiplier $12_1$, where the next element, s(1), of PN sequence s(n) is used as the remaining input. The product, s(1)×(n+1) is then used as an input to adder $14_1$, where the remaining input is the product s(0)×(n) from the output of D flip-flip set $16_0$. Therefore, the sum "s(0)×(n)+s(1)×(n+1)" is applied as the input to be stored in D flip-flop set $16_1$. Proceeding in a straightforward manner, each stage in correlator 10 functions in the same manner so that the output from the final adder $14_{63}$ is the correlation estimate, $R_{xs}(k)$. In contrast to prior art arrangements that first performed all multiplications and then a single addition, the architecture of the present invention performs one addition (relatively simple, since one addend is only a four bit word) per cycle.

Figure 2:
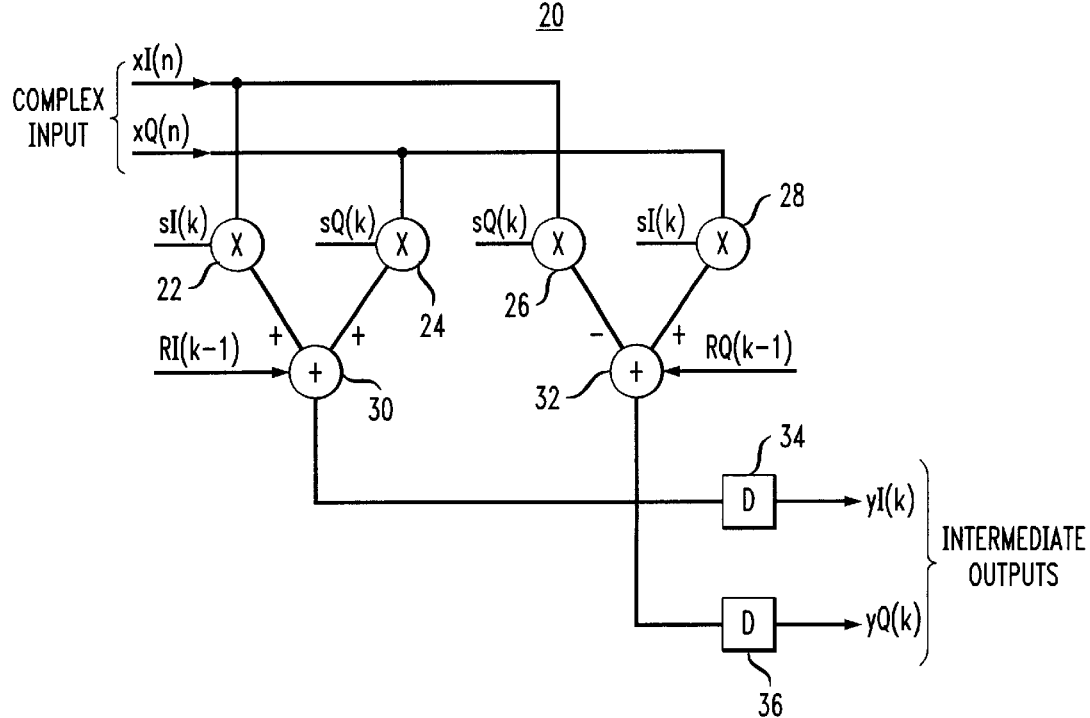
FIG. 2 shows an exemplary functional unit of a transverse form correlator of the present invention, with all computations performed in the complex domain.

As shown in FIG. 1, the basic architecture of the transpose form correlator is very modular, consisting of a functional unit 20 comprising a multiplier 12, adder 14, and memory unit 16 (for example, a set of D flip-flops). Such an arrangement is, therefore, straightforward to implement in silicon by merely replicating functional unit 20 the desired number of times for each stage (for example, 64 stages in FIG. 1). In accordance with the present invention, the realization of functional unit 20 in the complex domain has been found to reduce the size and power requirements of the resultant correlator structure. FIG. 2 illustrates an exemplary functional unit 20, for example, the $k^{th}$ stage of a correlator such as correlator 10 of FIG. 1, implemented in the complex domain in accordance with the present invention. As shown, the complex input is defined by the components xI(n) and xQ(n). Similarly, the exemplary $k^{th}$ element of the PN sequence s(n) is represented by its components sI(k) and sQ(k). The required multiplication is carried out by a set of four multipliers 22, 24, 26, and 28, performing the functions as defined above in equation (2). In particular, the inputs to first multiplier 22 are the "I" components xI(n) and sI(k) and the inputs to second multiplier 24 are the "Q" components xQ(n) and sQ(k). Multipliers 26 and 28 are used to provide the cross-coupled IQ components of the inputs.

The products xI(n)sI(k) and xQ(n)sQ(k) are then summed in a first adder 30. The "intermediate" component from the previous stage, defined as RI(k−1) (that is, the "I" component of the sum stored in memory unit $16_{k-1}$) is used as the remaining input to adder 30. Their sum is defined as the "I" component of the output signal, RI(k). In a similar manner, the cross products xI(n)sQ(k) and xQ(n)sI(n) are summed in a second adder 32 (where the negated value −xQ(n)sI(n) is used is accordance with complex signal processing) with previous component RQ(k−1) to provide the Q component of the output signal, RQ(k). These components are then applied as inputs to a pair of D flip-flop sets 34,36 that are used as the memories for storing the I and Q components within functional unit 20. In order to provide the full architecture of a correlator in the complex domain, functional unit 20, including all of the quadrature components, is replicated for each stage in an N stage correlator.

Each element of PN sequence s(n) is represented by either −1 or +1, that is: $s_I(k)$, $s_Q(k) \in \{-1, +1\}$. In practice, x(n) is represented in 2's complement. To represent sequence s(k) in 2's complement, the representation $\{-1,+1\}$ is mapped into $\{0,1\}$, where in particular −1 is mapped to 0 and +1 is mapped to 1. With this information, multipliers 22, 24, 26 and 28 may be simplified and replaced with multiplexers that are used to select between the input signal x(n) or its negated value, −x(n). In particular, negation is accomplished by "1's complement plus 1" (i.e., −x(n)=x(n)+1).

Figure 3:
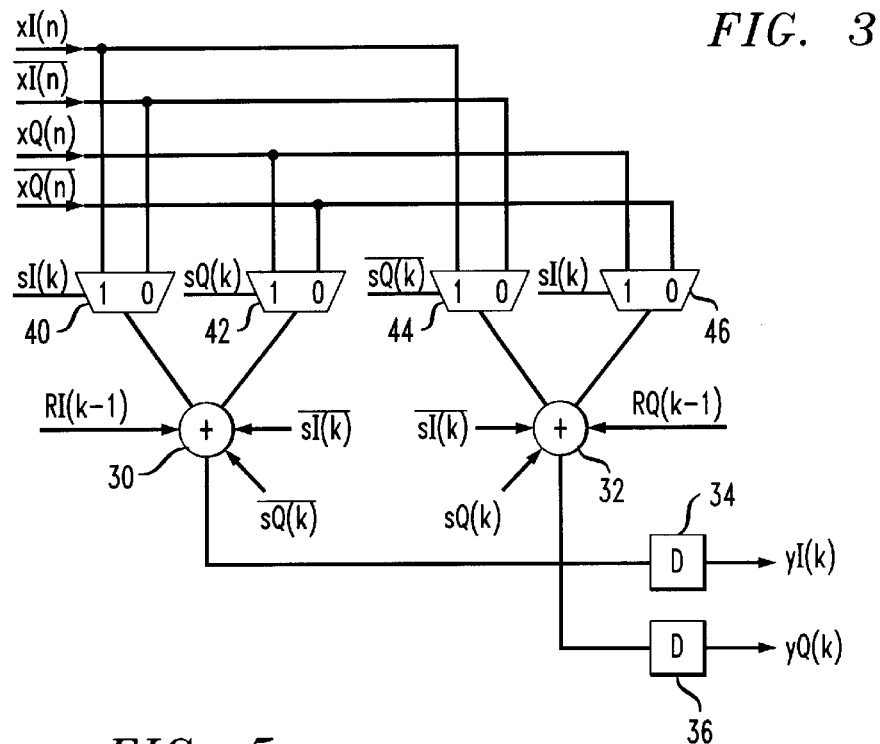
FIG. 3 is a modified embodiment of the functional unit of FIG. 2, utilizing multiplexers in place of multipliers.

FIG. 3 illustrates a simplified version of functional unit 20, with a set of multiplexers 40, 42, 44 and 46 used in place of multipliers 22, 24, 26 and 28. Referring to FIG. 3, an additional set of input signals, namely, the complemented values of complex input signal xI(n), xQ(n) are used. That is, the input to functional unit 20 now comprises four components: xI(n), xI(n), xQ(n) and xQ(n). Since the values of s(k) are either −1 or +1, each multiplexer unit selects the respective value, for example, xI(n) or xI(n), based upon the value of, for example, sI(k). As shown in FIG. 3, a first multiplexer 40 has its pair of inputs xI(n) and xI(n), where sI(k) is used to control the selection process. Multiplexer 42 has as its inputs the signal pair xQ(n) and xQ(n), where sQ(k) is used to control the selection between this pair of inputs. Similarly, multiplexer 44 has as its inputs xI(n), xI(n), where sQ(k) is used to control the selection and, lastly, multiplexer 46 has inputs of xQ(n), xQ(n), where sI(k) is used as the selection control. Since negation is accomplished by "1's complement plus 1", adders 30,32 need to accommodate two 1-bit inputs at the least significant bit position. As with the arrangement of FIG. 2, D flip-flop sets 34,36 are used to provide the final output components RI(k), RQ(k).

Figure 4:
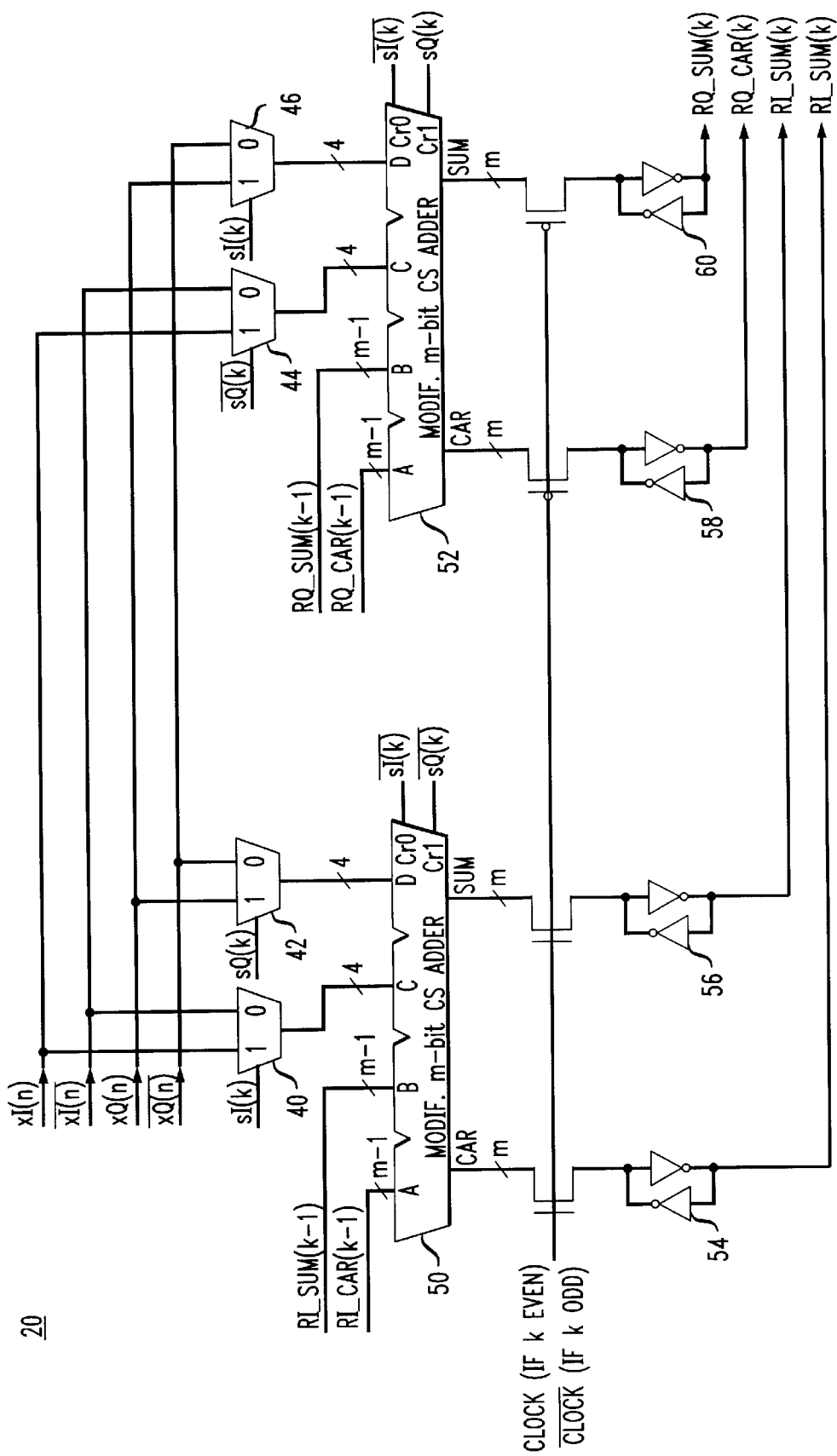
FIG. 4 is an alternative embodiment of the functional unit of FIG. 2, with multipliers being replaced by multiplexers, a carry-save adder, and a pair of 2-inverter latches used in place of the D flip-flops.

As the addition progresses into the subsequent stages of correlator 10, the summmation required to be carried out by adders 30,32 become wider and, as a result, more time-consuming. For example, RI(62), a twelve-bit wide value, must be added to the multiplexed (4-bit) outputs from an associated pair of multiplexers. The power consumption for such an arrangement also increases, particularly if a relatively large correlator (for example, with 512 stages) is used. Therefore, in accordance with the present invention, a conventional carry-propagate adder may be replaced by a carry-save adder. FIG. 4 illustrates an exemplary $k^{th}$ stage functional unit 20 of the present invention where conventional adders 30,32 have been replaced by a pair of carry-save adders 50,52. In implementation, the sum and carry bits are separately generated and stored from stage to stage (in contrast to a conventional carry-propagate adder where the "carry" bit is propagated through the entire addition operation). Carry-save adders 50,52 require an increased number of latches (since the carry bits need to be stored), but eliminates the need for ripple carry adders and decreases switching activity, thereby reducing power consumption for the correlator as a whole. Referring to FIG. 4, carry-save adder 50 receives as inputs the four-bit value from first multiplexer 40 (denoted as input "C") and the four-bit value from second multiplexer 42 (denoted as input "D"). Also applied as inputs to carry-save adder 50 are the I-based m−1 (or m) width "sum" and "carry" outputs from the previous stage, denoted RI_SUM (k−1) (the "sum " value) and RI_CAR(k−1) (the "carry" value). These signals are applied labeled as "B" and "A", respectively, on carry-save adder 50. The carry-in bits CR0 and CR1 allow negation of xI(n) and xQ(n) using the "complement plus one" scheme. As a result of the addition, as will be described in detail below in association with FIG. 5, carry-save adder 50 will generate two m-bit output signals, the "sum " and the "carry, denoted "RI_SUM(k)" and "RI_CAR(k)" in FIG. 4. Carry-save adder 52 functions in a similar manner to generate the Q-based pair of m-bit signals "RQ_SUM(k)" and "RQ_CAR(k)".

The arrangement of FIG. 4 also illustrates the replacement of D flip-flops 30,32 with pairs of 2-inverter latches under clock control. As shown a first pair of 2-inverter latches 54,56 is coupled to the pair of outputs from carry-save adder 50, with m-bit "carry" signal RI_CAR(k) stored in the 2-inverter pair 54 and m-bit "sum " signal RI_SUM(k) stored in the 2-inverter pair 56. The m-bit outputs from carry-save adder 52 are similarly coupled to 2-inverter pairs 58 and 60, respectively. As shown in FIG. 4, the clock is controlled by the value of "k", with, for example, a positive-going clock signal for "even" values of "k" and a negative-going clock signal for "odd" values of "k". The set of outputs from this exemplary embodiment are denoted RQ_SUM (k), RQ_CAR(k), RI_SUM (k), and RI_CAR (k), as shown. These intermediate values are then applied as inputs to the next stage's set of carry-save adders (not shown) to continue the correlation process.

In each embodiment as discussed above, it is obvious that the hardware used to compute the "I" component is identical to that used to compute the "Q" component. Therefore, in accordance with the present invention, the amount of hardware can be reduced nearly in half by using the same set of multiplexers, adder and latches to perform the required operations. In order to accomplish this reduction, input and output multiplexers are required to share the hardware between the I and Q components. FIG. 5 illustrates an implementation of the functional unit of FIG. 4 as a multi-plexed arrangement requiring only a pair of multiplexers 62,64, a single carry-save adder 66. A first pair of 2-inverter latches 68,70, are used to provide the outputs RI_SUM and RI_CAR. A second pair of 2-inverted latches 72,74 are then used to provide the outputs RQ_SUM and RQ_CAR. The pairs of latches are controlled by a clock 76, which also controls the gating between the presentation of the "I" components and "Q" components to multiplexers 62,64. In particular, clock 76 controls the presentation of xI(n) or xQ(n) from unit 71, to which both xI(n) and xQ(n) are presented as inputs. Similarly, unit 73 receives as inputs (sI(k),sQ(k)) and (sQ(k),sI(k)) and is controlled by clock 76 to present the proper pair as the control inputs to multiplexers 62,64. Similarly, unit 75 receives as inputs the intermediate values RI(k−1) and RQ(k−1) from the previous stage and is controlled by clock 76 to present either the "I" or "Q" value as inputs to carry-save adder 66.

Figure 6:
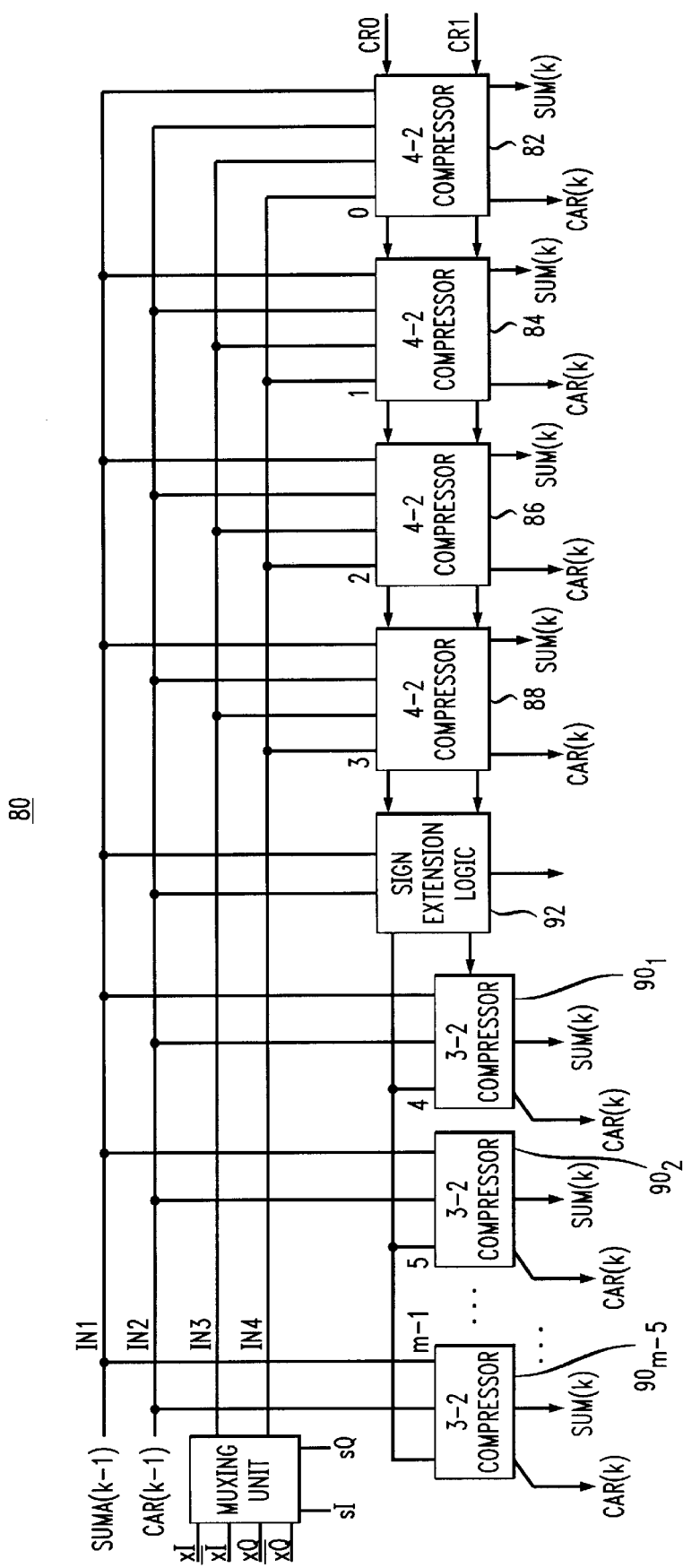
FIG. 6 is a bit-level schematic of an exemplary carry-save adder used in association with the present invention.

FIG. 6 illustrates, in detailed form, an exemplary "$k^{th}$-stage" carry-save adder 80, where the width of adder 80, denoted "m", is given by:

$$m=4\lceil \log_2 k \rceil. \quad (3)$$

Figure 7:
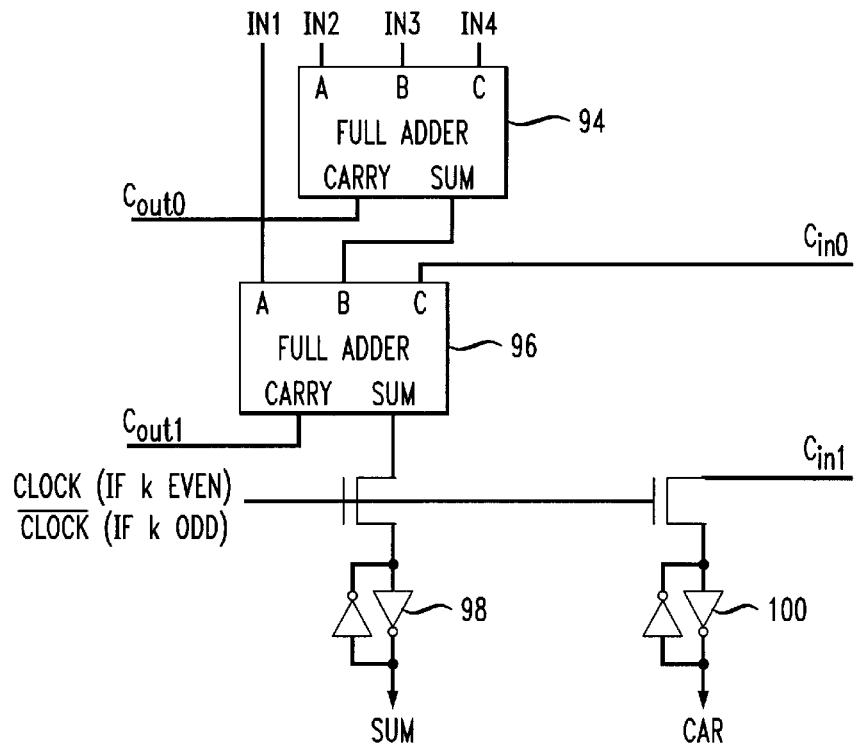
FIG. 7 illustrates a single bit-slice of an exemplary 4-2compressor used in the functional unit described above.

The lowest four bits of carry-save adder 80 comprise a set of four 4-2 compressors 82, 84, 86 and 88. Since each stage of a correlator requires the "present" 4-bit values to be added to the prior intermediate value (for the first stage, the prior intermediate value is "0"), this set of compressors is identical for each stage in the correlator, regardless of its location along the chain of stages. A single bit from each of the inputs A, B, C and D are applied as separate inputs to each of the four 4-2 compressors, where each compressor provides a 2-bit output, denoted R_SUM (k) and R_CAR(k) in FIG. 6. FIG. 7 illustrates an exemplary 4-2 compressor that will be discussed in detail hereinbelow. Referring back to FIG. 6, carry-save adder 80 further comprises a plurality of 3-2 compressors $90_i$, where a total of "m−5" such compressors are required since the first four stages comprise the 4-2 compressors and a total of "m−1" compressors are required to perform the complete addition process. Interposed between final 4-2 compressor 88 and first 3-2 compressor $90_1$ is a sign extension logic unit 92. Sign extension logic unit 92 is used as the third input to each 3-2 compressor (as shown in detail in FIG. 8) to allow for a 3-2 compressor to be used in place of the 4-2 compressor.

Referring to FIG. 7, an exemplary 4-2 compressor (as used in the embodiment of FIG. 6) is illustrated. As shown, the compressor comprises a pair of full adders 94 and 96. Full adder 94 receives as three separate inputs the associated bit of m-bit R_CAR(k−1) (i.e., the appropriate bit of the "carry" from the previous stage), as well as the associated bit of the four-bit outputs from the multiplexers. This three-bit addition results in generating a "sum " output and a "carry" output, as shown. In accordance with the carry-save arrangement of the present invention, the "carry" output is sent to the next higher bit position to be used as an input to the next compressor (i.e., compressor 86 as shown in FIG. 6). The "sum " output is used as an input to the next full adder 96, where the second bit of the m-bit R_SUM(k−1) and the carry bit from the previous stage (labeled $C_{in0}$) are also applied as inputs to adder 96. As with full adder 94, full adder 96 generates a "sum " output and "carry" output. The "sum " output subsequently passes through a pair of 2-inverter latches 98,100 to generate the R_SUM and R_CAR values associated with compressor 84. The "carry" output, denoted $C_{out1}$, is sent to the next 4-2 compressor (for example, compressor 86 of FIG. 6) and is used as the $C_{in1}$ input to its 2-inverter latch, just as the value $C_{in1}$ from previous 4-2 compressor 82 is used as an input to 2-inverter pair 100 in FIG. 7.

Figure 8:
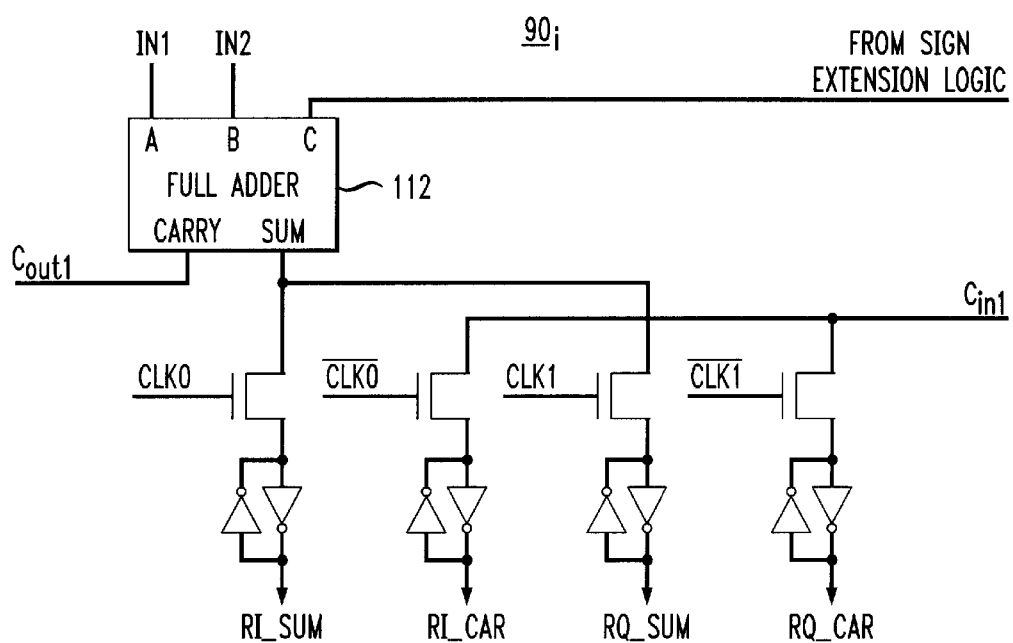
FIG. 8 illustrates a single bit-slice of an exemplary 3-2 compressor used in the functional unit described above.

FIG. 8 illustrates an exemplary 3-2 compressor $90_i$. Compressor 90 comprises a full adder 112. The three inputs to adder 112 include the sign extension bit from logic unit 92 (see FIG. 6), as well as the associated bit from the R_SUM and R_CAR components of the previous stage. This addition results in generating a "carry" output, denoted $C_{out1}$ and a "sum " output. In the arrangement illustrated in FIG. 8, the "sum " output is coupled to two separate sets of 2-inverter latches. In this arrangement, a two-phased clock signal is then used to generated the four outputs associated with this addition: RI_SUM, RI_CAR, RQ_SUM and RQ_CAR.

What is claimed is:

1. In a CDMA receiver, a transverse correlator for recovering an information signal from a received message signal x(n) correlated with a locally-generated pseudo-random sequence s(n), the correlation signal $R_{xs}$ defined by $$\tilde{R}_{xs}(n) = \sum_{k=0}^{N-1} x(k)s^*(n+k),$$

where n is defined as the number of samples in the received message signal, k is a predetermined correlation length, and s*(.) denotes the complex conjugate of the sequence s(.), said correlator comprising a serial plurality of N stages, each stage including a multiplier having as a first input the received message signal x(n) and as a second input a selected element s(k) from the sequence s(n) to generate a product output x(n)s(k);

an adder arrangement having as a first input the product output from said multiplier and as a second input an intermediate result from a previous stage of said serial plurality of stages, for providing as an output a correlation sum for the current stage; and a memory unit for storing said correlation sum for said current stage and providing said sum as the intermediate result to an adder for the subsequent stage of said plurality of N stages, where the output from the Nth stage adder is defined as the correlation signal $R_{xs}$.

2. A CDMA receiver as defined in claim 1 wherein the memory unit comprises a set of D flip-flops.

3. A CDMA receiver as defined in claim 1 wherein the received message signal x(n) comprises a pair of complex-valued components defined by xI(n) and xQ(n) and an element s(k) from the pseudo-random sequence s(n) is represented by a pair of complex-valued components sI(k) and sQ(k), wherein the values of sI(k) and sQ(k) are chosen from the set consisting of {−1,1}, and each multiplier of said transverse correlator comprises a set of four multiplexers, a first multiplexer having as inputs xI(n) and sI(k), a second multiplexer having as inputs xQ(n) and sQ(k), a third multiplexer having as inputs xI(n) and sQ(k), and a fourth multiplexer having as inputs xQ(n) and sI(k);

each adder arrangement comprises a pair of adders, a first adder for summing xI(n)sI(k) and xQ(n)sQ(k) with its associated intermediate value from the previous stage, and a second adder for summing—xI(n)sQ(k) and xQ(n)sI(k) with its associated intermediate value from the previous stage; and each memory unit comprises a pair of memory devices for separately storing each sum generated by each adder in the adder arrangement.

4. A CDMA receiver as defined in claim 1 wherein the received message signal x(n) comprises a pair of complex-valued components xI(n) and xQ(n) and an element s(k) of the pseudo-random sequence s(n) comprises a pair of complex-valued components sI(k) and sQ(k), wherein the values for sI(k) and sQ(k) are chosen from the set consisting of {−1,1}, and each multiplier of said transverse correlator comprises a set of four multiplexers, a first multiplexer having as inputs either the pair xI(n), sI(k) or xI(n), sI(k), as controlled by the value of multiplexing signal sI(k), a second multiplexer having as inputs either the pair xQ(n), sQ(k) or xQ(n), sQ(k), as controlled by the value of multiplexing signal sQ(k), a third multiplexer having as inputs either the pair xI(n), sQ(k) or xI(n), sQ(k), as controlled by the value of multiplexing signal sQ(k), and a fourth multiplexer having as inputs either xQ(n), sI(k) or xQ(n), sI(k), as controlled by the value of multiplexing signal sI(k), each adder arrangement comprising a pair of adders, a first adder having as inputs the outputs from the first and second multiplexers, as well as its associated value from the previous stage, and a second adder having as inputs the outputs from the third and fourth multiplexers, as well as its associated value from the previous stage.

5. A CDMA receiver as defined by claim 3 wherein each adder arrangement comprises a carry-save adder for separately generating the sum value and the carry value.

6. A CDMA receiver as defined in claim 5 wherein each carry-save adder comprises a set of four 4-2 compressors, each 4-2 compressor responsive to separate bits of the multiplexed x(n) and s(k) complex values and the first four bits of the intermediate results from the previous stage for providing as an output a 2-bit word, a first bit associated with the sum and a second bit associated with the carry; and a plurality of 3-2 compressors, each 3-2 compressor receiving as an input a separate one of the remaining bits of the intermediate result from the previous stage.

7. A CDMA receiver as defined in claim 1 wherein each memory unit comprises a pair of 2-inverter latches.

8. A transverse correlator for recovering an information signal from a received message signal x(n) correlated with a locally-generated pseudo-random sequence s(n), the correlation signal $R_{xs}$ defined by $$\tilde{R}_{xs}(n) = \sum_{k=0}^{N-1} x(k)s^*(n+k),$$

where n is defined as the number of samples in the received message signal, k is a predetermined correlation length, and s*(.) denotes the complex conjugate of the sequence s(.), said correlator comprising a serial plurality of N stages, each stage including a multiplier having as a first input the received message signal x(n) and as a second input a selected element s(k) from the sequence s(n) to generate a product output x(n)s(k);

an adder arrangement having as a first input the product output from said multiplier and as a second input an intermediate result from a previous stage of said serial plurality of stages, for providing as an output a correlation sum for the current stage; and a memory unit for storing said correlation sum for said current stage and providing said sum as the intermediate result to an adder for the subsequent stage of said plurality of N stages, where the output from the Nth stage adder is defined as the correlation signal $R_{xs}$.

9. A transverse correlator as defined in claim 8 wherein the memory unit comprises a set of D flip-flops.

10. A transverse correlator as defined in claim 8 wherein the received message signal x(n) comprises a pair of complex-valued components defined by xI(n) and xQ(n) and an element s(k) from the pseudo-random sequence s(n) is represented by a pair of complex-valued components sI(k) and sQ(k), wherein the values of sI(k) and sQ(k) are chosen from the set consisting of {−1,1}, and each multiplier of said transverse correlator comprises a set of four multiplexers, a first multiplexer having as inputs xI(n) and sI(k), a second multiplexer having as inputs xQ(n) and sQ(k), a third multiplexer having as inputs xI(n) and sQ(k), and a fourth multiplexer having as inputs xQ(n) and sI(k);

each adder arrangement comprises a pair of adders, a first adder for summing xI(n)sI(k) and xQ(n)sQ(k) with its associated intermediate value from the previous stage, and a second adder for summing −xI(n)sQ(k) and xQ(n)sI(k) with its associated intermediate value from the previous stage; and each memory unit comprises a pair of memory devices for separately storing each sum generated by each adder in the adder arrangement.

11. A transverse correlator as defined in claim 8 the received message signal x(n) comprises a pair of complex-valued components xI(n) and xQ(n) and an element s(k) of the pseudo-random sequence s(n) comprises a pair of complex-valued components sI(k) and sQ(k), wherein the values for sI(k) and sQ(k) are chosen from the set consisting of {−1,1}, and each multiplier of said transverse correlator comprises a set of four multiplexers, a first multiplexer having as inputs either the pair xI(n), sI(k) or xI(n), sI(k), as controlled by the value of multiplexing signal sI(k), a second multiplexer having as inputs either the pair xQ(n), sQ(k) or xQ(k), as controlled by the value of multiplexing signal sQ(k), a third multiplexer having as inputs either the pair xI(n),sQ(k) or xI(n), sQ(k), as controlled by the value of multiplexing signal sQ(k), and a fourth multiplexing having as inputs either xQ(n), sI(k) or xQ(n), sI(k), as controlled by the value of multiplexing signal sI(k), each adder arrangement comprising a pair of adders, a first adder having as inputs the outputs from the first and second multiplexers, as well as its associated value from the previous stage, and a second adder hacing as inputs the outputs from the third and fourth multiplexers, as well as its associated value from the previous stage.

12. A transverse correlator as defined by claim 10 wherein each adder arrangement comprises a carry-save adder for separately generating the sum value and the carry value.

13. A transverse correlator as defined in claim 12 wherein each carry-save adder comprises a set of four 4-2 compressors, each 4-2 compressor responsive to separate bits of the multiplexed x(n) and s(k) complex values and the first four bits of the intermediate results from the previous stage for providing as an output a 2-bit word, a first bit associated with the sum and a second bit associated with the carry; and a plurality of 3-2 compressors, each 3-2 compressor receiving as an input a separate one of the remaining bits of the intermediate result from the previous stage.

14. A transverse correlator as defined in claim 8 wherein each memory unit comprises two pairs of 2-inverter latches.

15. An integrated circuit including a transverse correlator for recovering an information signal from a received message signal x(n) correlated with a locally-generated pseudo-random sequence s(n), the correlation signal $R_{xs}$ defined by $$\tilde{R}_{xs}(n) = \sum_{k=0}^{N-1} x(k)s^*(n+k),$$

where n is defined as the number of samples in the received message signal, k is a predetermined correlation length, and s*(.) denotes the complex conjugate of the sequence s(.), said correlator comprising a serial plurality of N stages, each stage including a multiplier having as a first input the received message signal x(n) and as a second input a selected element s(k) from the sequence s(n) to generate a product output x(n)s(k);

an adder arrangement having as a first input the product output from said multiplier and as a second input an intermediate result from a previous stage of said serial plurality of stages, for providing as an output a correlation sum for the current stage; and a memory unit for storing said correlation sum for said current stage and providing said sum as the intermediate result to an adder for the subsequent stage of said plurality of N stages, where the output from the Nth stage adder is defined as the correlation signal $R_{xs}$.

16. An integrated circuit as defined in claim 15 wherein the memory unit comprises a set of D flip-flops.

17. An integrated circuit as defined in claim 15 wherein the received message signal x(n) comprises a pair of complex-valued components defined by xI(n) and xQ(n) and an element s(k) from the pseudo-random sequence s(n) is represented by a pair of complex-valued components sI(k) and sQ(k), wherein the values of sI(k) and sQ(k) are chosen from the set consisting of {−1,1}, and each multiplier of said transverse correlator comprises a set of four multiplexers, a first multiplexer having as inputs xI(n) and sI(k), a second multiplexer having as inputs xQ(n) and sQ(k), a third multiplexer having as inputs xI(n) and sQ(k), and a fourth multiplexer having as inputs xQ(n) and sI(k);

each adder arrangement comprises a pair of adders, a first adder for summing xI(n)sI(k) and xQ(n)sQ(k) with its associated intermediate value from the previous stage, and a second adder for summing −xI(n)sQ(k) and xQ(n)sI(k) with its associated intermediate value from the previous stage; and each memory unit comprises a pair of memory devices for separately storing each sum generated by each adder in the adder arrangement.

18. An integrated circuit as defined in claim 15 wherein the received message signal x(n) comprises a pair of complex-valued components xI(n) and xQ(n) and an element s(k) of the pseudo-random sequence s(n) comprises a pair of complex-valued components sI(k) and sQ(k), wherein the values for sI(k) and sQ(k) are chosen from the set consisting of {−1,1}, and each multiplier of said transverse correlator comprises a set of four multiplexers, a first multiplexer having as inputs either the pair xI(n), sI(k) or xI(n), sI(k), as controlled by the value of multiplexing signal sI(k), a second multiplexer having as inputs either the pair xQ(n), sQ(k) or xQ(n), sQ(k), as controlled by the value of multiplexing signal sQ(k), a third multiplexer having as inputs either the pair xI(n), sQ(k) or xI(n), sQ(k), as controlled by the value of multiplexing signal sQ(k), and a fourth multiplexer having as inputs either xQ(n), sI(k) or xQ(n), sI(k), as controlled by the value of multiplexing signal sI(k), each adder arrangement comprising a pair of adders, a first adder having as inputs the outputs from the first and second multiplexers, as well as its associated value from the previous stage, and a second adder having as inputs the outputs from the third and fourth multiplexers, as well as its associated value from the previous stage.

19. An integrated circuit as defined by claim 17 wherein each adder arrangement comprises a carry-save adder for separately generating the sum value and the carry value.

20. An integrated circuit as defined in claim 19 wherein each carry-save adder comprises
- a set of four 4-2 compressors, each 4-2 compressor responsive to separate bits of the multiplexed $x(n)$ and $s(k)$ complex values and the first four bits of the intermediate results from the previous stage for providing as an output a 2-bit word, a first bit associated with the sum and a second bit associated with the carry; and
- a plurality of 3-2 compressors, each 3-2 compressor receiving as an input a separate one of the remaining bits of the intermediate result from the previous stage.

21. An integrated circuit as defined in claim 15 wherein each memory unit comprises two pairs of 2-inverter latches.

* * * * *